(12) United States Patent
Puckette et al.

(10) Patent No.: US 6,346,875 B1
(45) Date of Patent: Feb. 12, 2002

(54) GHM AGGREGATOR

(75) Inventors: Charles McDonald Puckette, Scotia; Gary Jude Saulnier, Rexford; Richard August Korkosz, Rotterdam Junction; John Erik Hershey, Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/476,821

(22) Filed: Jan. 3, 2000

(51) Int. Cl.[7] .............................................. H04M 11/04
(52) U.S. Cl. ............. 340/310.01; 340/539; 340/310.05; 340/310.06
(58) Field of Search ........................... 340/310.01, 539, 340/310.05, 310.06, 870.02, 870.05, 870.011

(56) References Cited

U.S. PATENT DOCUMENTS

| | | | | |
|---|---|---|---|---|
| 5,239,575 A | * | 8/1993 | White et al. ........... 340/870.02 |
| 5,243,338 A | * | 9/1993 | Brennan, Jr. et al. ... 340/870.02 |
| 5,252,967 A | * | 10/1993 | Brennan et al. ........ 340/870.02 |
| 5,311,581 A | * | 5/1994 | Merriam et al. ........ 340/870.03 |
| 5,519,692 A | | 5/1996 | Hershey et al. ............. 375/216 |
| 5,519,725 A | | 5/1996 | Hershey et al. ............. 370/210 |
| 5,553,094 A | * | 9/1996 | Johnson et al. ........ 340/870.03 |
| 5,563,906 A | | 10/1996 | Hershey et al. ............. 375/130 |
| 5,568,508 A | | 10/1996 | Hershey ..................... 375/130 |
| 5,708,966 A | | 1/1998 | Al-Dhahir et al. ......... 455/13.4 |
| 5,844,949 A | | 12/1998 | Hershey et al. ............. 375/346 |
| 5,897,607 A | * | 4/1999 | Jenney et al. ................. 702/62 |
| 5,903,594 A | | 5/1999 | Saulnier et al. ............. 375/130 |
| 5,933,092 A | * | 8/1999 | Ouellette et al. ....... 340/870.02 |

OTHER PUBLICATIONS

One–Way Meter Unit by Unique Technology.

* cited by examiner

Primary Examiner—Daryl Pope
(74) Attorney, Agent, or Firm—John F. Thompson; Jill M. Breedlove

(57) ABSTRACT

The invention provides an aggregator for use in connection with a power distribution network including a power line. The aggregator comprises a receiver, a controller, and a data outbound link. The receiver is coupled to the power line and is configured to receive signals comprising messages, for example geometric harmonic modulation (GHM) signals, from the power line. The controller is coupled to the receiver and to the data outbound link. The controller is configured to provide messages received by the receiver to the data outbound link for transmission by radio frequency energy to a destination, for example a power control station.

18 Claims, 2 Drawing Sheets

GHM AGGREGATOR

BACKGROUND OF THE INVENTION

This invention relates generally to power line communications (PLC) systems and more particularly, to a power line communication system for transmitting commands and data past capacitor banks of typical power distribution grids.

Electric power supply companies typically have a service person visit customer sites to read an electricity meter at the site to determine the amount of energy consumed for billing purposes. This can be cumbersome and time consuming, particularly when there are many customer sites over a large geographic area.

Automatic Meter Reading (AMR) is the remote collection of consumption data from customers' utility meters using telephony, radio frequency, power-line and satellite communications technologies. AMR provides water, gas and electric utility-service companies the opportunity to increase operational efficiency, improve customer service, reduce data-collection costs and quickly gather critical information that provides insight to company decision-makers.

Many systems have been proposed for automated meter reading (AMR) operations. Some systems involve, for example, power line or radio communications. Other systems are hybrids, i.e., involve both power line and radio communications. Typically, data and commands can be transmitted between a central station and the electricity meters. Such communication systems enable utilities to easily and quickly obtain energy consumption measurements at many different sites.

Geometric Harmonic Modulation (GHM) of communication signals for transmission on the power line is particularly well suited for AMR applications since GHM signals can be transmitted through power line components such as distribution transformers. GHM is described, for example, in Hershey et al., U.S. Pat. No. 5,519,725, which is assigned to the present assignee. Generally, GHM allocates signaling energy into lobes, or tones, or different frequencies evenly spaced. The GHM signaling waveforms are spread spectrum signals in that the signal bandwidth, i.e., the bandwidth from the lowest frequency tone to the highest, exceeds the information bandwidth conveyed by the GHM transmission.

GHM signals are typically carried on carriers having frequencies above 5 kHz to avoid the large spectral components of the 60 Hz power signal. In addition, higher frequencies are more readily transmitted through the distribution transformers existing in typical power line systems. However, the higher the selected GHM carrier frequency set, the more the GHM signal is attenuated by capacitor banks residing in typical power line systems. Therefore, a need exists for systems and methods which transmit data through power distribution transformers, while overcoming the limitations imposed by capacitor banks in the distribution grid.

BRIEF SUMMARY OF THE INVENTION

The invention provides an aggregator for use in connection with a power distribution network including a power line. The aggregator comprises a receiver, a controller, and a data outbound link. The receiver is coupled to the power line and is configured to receive signals comprising messages, for example geometric harmonic modulation (GHM) signals, from the power line. The controller is coupled to the receiver and to the data outbound link. The controller is configured to provide messages received by the receiver to the data outbound link for transmission by radio frequency energy to a destination, for example a power control station.

DETAILED DESCRIPTION OF THE INVENTION

Figure 1:
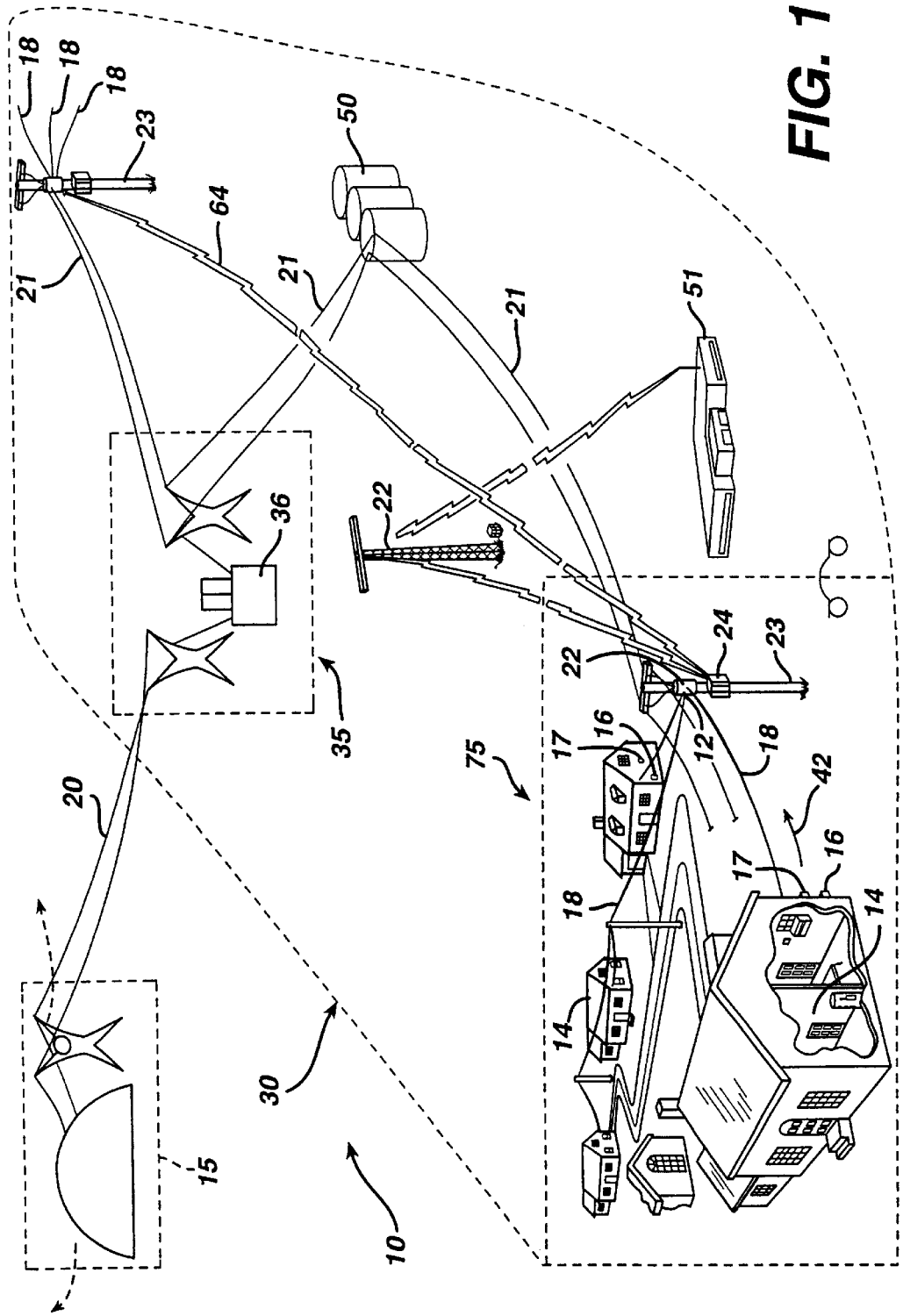
FIG. 1 is a pictorial diagram of an embodiment of an aggregator of the present invention as it appears in relation to a power distribution grid.

As illustrated in FIG. 1, electric power grids 10 generally comprise three components: generating plants 15 (one shown), transmission lines 20, and distribution systems 30. Although only one path is illustrated, transmission lines 20 provide multiple paths from electricity generating plant 15 to distribution substations such as the one illustrated at 35. Substations 35 comprise transformers 36 which step the transmission voltage, typically in the range of tens to hundreds of thousands of volts, down to distribution voltages. Distribution voltages are typically less than 10,000 volts. Distribution lines 21 connect the substations 35 to the consumer 14. The distribution voltage is stepped down to the service voltage, typically 240 Volts in the United States, by step down transformer 22. Step down transformer 22 is located on a utility pole 23, situated within a cluster, or island 75, of consumers 14. An "island" for purposes of this specification is defined to be a plurality of consumers to whom service voltage is derived from a single transformer 22. The 240 Volt service provided by transformer 22 is conveyed to consumers' business or residential sites 14 via power lines 18.

It is important to note that a plurality of capacitor banks, such as the one illustrated at 50, are also situated within power distribution grids. These regulate the voltage on the lines to prevent under-voltage and over-voltage conditions. Unfortunately, capacitors such as 50 tend to attenuate communication signals increasingly as signal frequency increases.

Power is typically routed through meters 17 as it enters the customer's locations. Meters 17 measure the amount of power consumed by each customer. In accordance with conventional approaches, each meter 17 is read on a regular basis by a service person who travels to each site 14 to take meter readings. One embodiment of the invention is a system for transmitting meter readings, in the form of communication signals, from consumer sites 14 to collection stations 51. The system comprises at least one transceiver 16 coupled to at least one meter 17 of at least one consumer site 14. Transceiver 16 determines usage data from meter 17 and employs the data to modulate a carrier signal, thereby transmitting the data from consumer 14 to transformer 22 via power line 18 in the direction of arrow 42.

In one embodiment of the invention, transceiver 16 is a GHM transceiver comprising a GHM receiver and a GHM transmitter. GHM for power line communications is described in U.S. Pat. No. 5,903,594 to Saulnier et al and in U.S. Pat. No. 5,844,949 to Hershey, et al. Both are assigned to the assignee of the present invention. Transceiver 16 transmits power consumption data in the form of GHM signals over power line 18. In one embodiment of the invention the data is formatted into packets. A packet is a collection of fields of bits, each field corresponding to a particular type of information. For example, a packet typically includes a source field, a destination field and at least one data field. The source field identifies the particular meter 17 whose power consumption data is being transmitted. The destination field identifies a destination for the data, e.g., an aggregator 24, a particular data collection station 51, or a utility office responsible for collecting data for meter 17. The data field contains the data of interest, e.g., a meter reading, which will be transmitted to, for example, data collection station 51.

Figure 2:
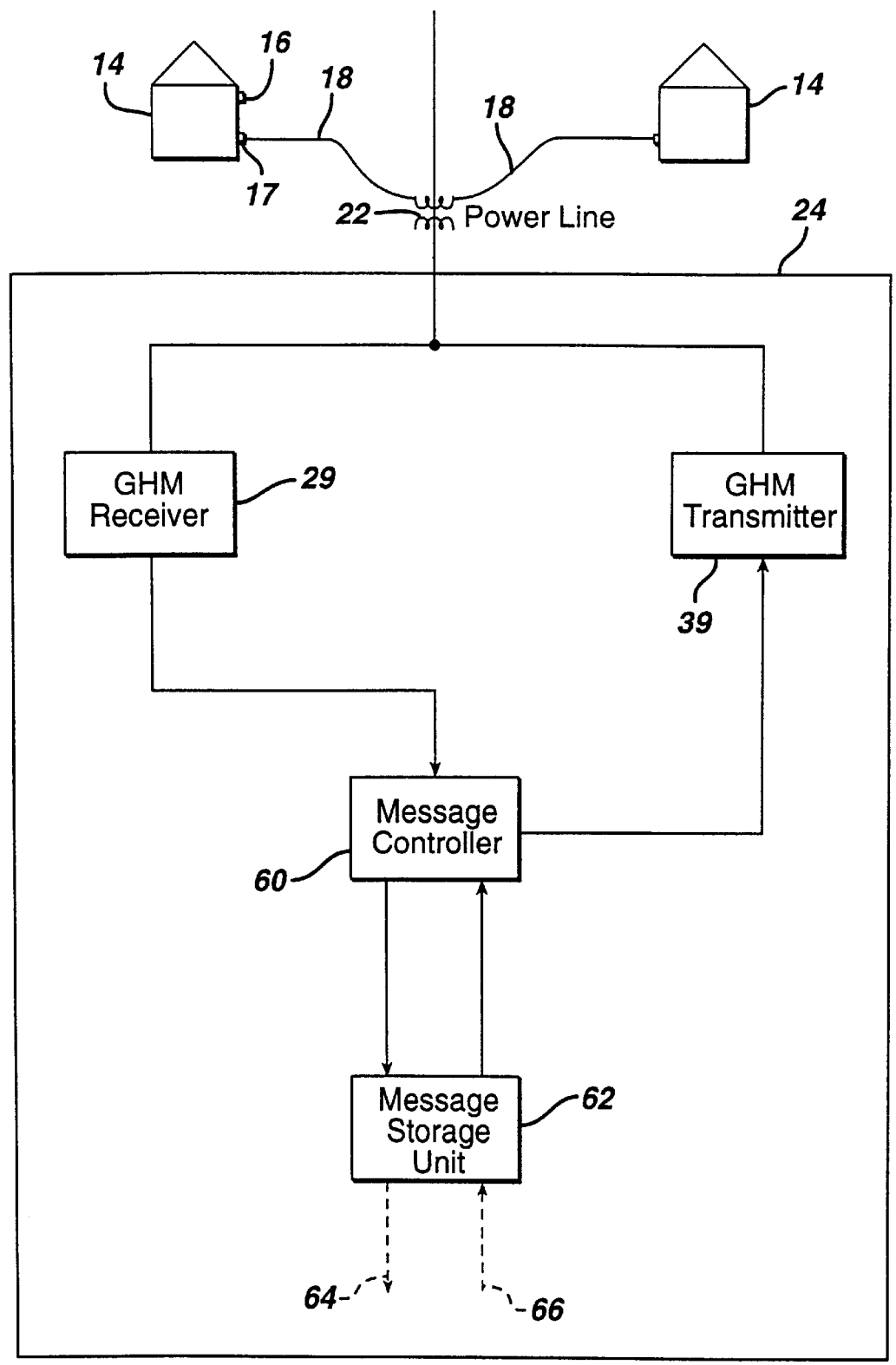
FIG. 2 is a simplified block diagram of an embodiment of an aggregator of the invention.

In this system, aggregator 24 in communication with at least one transceiver 16 within island 75. Aggregator 24 is configured to collect, or "aggregate", the GHM communications within island 75, especially when island 75 is isolated from other islands in the power distribution grid by capacitor banks 50. FIG. 2 is a block diagram of a typical aggregator 24 according to an embodiment of the invention. Specifically, aggregator 24 comprises a message controller 60, coupled to GHM transmitter 39 and GHM receiver 29. Aggregator 24 also includes a memory storage unit 62 coupled to message controller 60 and configured to store information received by and transmitted from aggregator 24. For purposes of this specification, the term "configured" means operatively assembled to perform a given function. A data outbound link 64 and a data inbound link 66 are coupled to message storage unit 62 such that data is provided to aggregator 24 by external sources, and vice versa.

Aggregator 24 is coupled to transformer 22 such that GHM signal packets transmitted over power lines 18 are received by GHM receiver 29. Aggregator 24 is further configured such that GHM signals transmitted by GHM transmitter 39 are transmitted over power line 18. GHM receiver 29 is configured to demodulate the GHM signal packets and recover the source, destination, and data therefrom. Suitable circuits for transmitting and receiving GHM signals are described in U.S. Pat. No. 5,519,725 to Hershey, et al. and assigned to the assignee of the present invention.

GHM receiver 29 is coupled to message controller 60 such that messages generated by transceiver 16 comprising, for example, source, destination and data are provided to message controller 60. Message controller 60 is configured to process the messages by executing a protocol for controlling communications, as described below in more detail. If the message received by message controller 60 requires a response to the message originator such as transceiver 16, then controller 60 generates a response message and supplies the message to transmitter 39 for transmission on the power line 18 to transceiver 16.

GHM messages that are to be forwarded beyond island 75 of FIG. 1 are sent to message storage unit 62. In that case, message controller 60 formats the data for transmission to its destination and provides the formatted data to message storage unit 62. In addition, message controller 60 is configured to receive incoming messages from message storage unit 62, and to format the incoming messages for transmission by GHM transmitter 29 through power lines 18 to transceivers 16. This configuration allows signals, for example, command and control signals to be transmitted from a central station 51, (FIG. 1), or allows another command source to be provided to transceivers 16 and meters 17.

With reference to both FIGS. 1 and 2, message storage unit 62 transmits messages stored in message storage unit 62 to destinations outside of island 75 via outbound link 64. Outbound link 64 is configured to execute conventional protocols required for such transmission. In some embodiments of the invention, protocols include authentication and encryption of messages. In one embodiment of the invention, the destination is a second aggregator (not shown) located on the transmission grid such that at least one capacitor bank 50 is interposed between aggregator 24 and the second aggregator. In that case, data from power line 18 is transmitted past capacitor bank 50 by means of radio frequency (RF) energy. In such an embodiment, outbound link 64 is a conventional radio frequency transmitter. The RF transmitter transmits an RF signal containing a message to the inbound link 66 of the second aggregator. For RF signals, inbound link 66 of the second aggregator 14 is a conventional RF receiver. The receiver is configured to recover the message from the RF carrier, and to provide the message to to message storage unit 62 of the second aggregator 14, and then to message controller 60 of the second aggregator 14 where it is formatted for transmission by GHM transmitter 39. GHM transmitter 39 of the second aggregator receives the message from message controller 60 of the second aggregator and transmits the message in the form of a GHM signal over power lines extending from the second aggregator to a destination transceiver 16 within the island defined by the second aggregator.

In an alternative embodiment of the invention, an RF signal from aggregator 24 is transmitted to a mobile collection station, such as an automobile equipped with an RF receiver. In another alternative embodiment of the invention, outbound link 64 is adapted to transmit data over a telephone line, either directly, or via a cellular telecommunications link, to a destination, for example collection station 52.

In another alternative embodiment of the invention outbound link 64 of aggregator 24 is a satellite uplink such as that provided by a very small aperture (VSAT) terminal, and inbound link 66 is a satellite downlink provided by a VSAT terminal. In such an embodiment data is related from one aggregator to another. Alternatively, data is relayed from an aggregator to a collection station. As those of ordinary skill in the art will recognize, a variety of configurations are possible through which messages may be routed and collected employing the system and method of the invention.

Data inbound link 66 conveys protocol information to message storage unit 62, and thereby to message controller 60. Protocol information includes status of messages previously forwarded by message storage unit 62, e.g., "message received without error—erase your copy" or "message not received properly—please retransmit".

As explained above, GHM is particularly well suited for power line communications applications since GHM signals can be transmitted through power line components such as distribution transformers. However, embodiments of the invention are not limited to GHM implementations. Those skilled in the art will understand that the invention is not limited to the embodiments discussed above, and further, that modifications can be made to the embodiments discussed above which are within the scope of the invention.

What is claimed is:

1. A communication system for use in connection with a power distribution network including a plurality of power lines, said communication system comprising:
   a GHM aggregator connected to at least one of the plurality of power lines, the GHM aggregator comprising:
   a GHM receiver coupled to said at least one of the plurality of power lines, said GHM receiver configured to receive GHM signals transmitted on said at least one of the plurality of power lines wherein the GHM signals correspond to data measured by at least one utility meter;

a controller coupled to said GHM receiver, said controller processing the GHM signals received by said GHM receiver wherein said controller demodulates the GHM signals into the data and converts the data into at least one message; and a data outbound link connected to said controller, the data outbound link comprising a transmitter for transmitting said at least one message without employing said at least one of the plurality of power lines as a transmission medium.

2. The communication system of claim 1 wherein the GHM aggregator further comprises a data inbound link and a GHM transmitter, said data inbound link connected to said controller for receiving inbound messages transmitted without employing said at least one of the plurality of power lines as a transmission medium, said GHM transmitter connected to said controller and said at least one of the plurality of power lines wherein the inbound messages are converted to GHM signals and transmitted by said GHM transmitter over said at least one of the plurality of power lines.

3. The communication system in accordance with claim 1 further comprising a message storage unit coupled to said controller and to said data outbound link, said message storage unit configured to store messages received from said controller and to provide said messages to said data outbound link for transmission.

4. The communication system in accordance with claim 2 wherein said data inbound link comprises a radio frequency receiver.

5. The communication system in accordance with claim 1 wherein said transmitter of said data outbound link comprises a satellite uplink.

6. The communication system in accordance with claim 2 wherein said data inbound link comprises a satellite downlink.

7. The communication system according to claim 1 wherein the data comprise power consumption data derived from a power meter connected to said at least one of the plurality of power line.

8. The communication system in accordance with claim 2 wherein said data in bound link comprises a telecommunications link.

9. A communication system for use with a power distribution network including at least one power line, said communication system comprising:

a GHM transceiver connect ed to the at least one power line for determining power consumption data and converting the power consumption data into GHM signals wherein said GHM transceiver transmits the GHM signals over the at least one power line; and a GHM aggregator connected to the at least one power line and receiving the GHM signals transmitted by the GHM transceiver, the GHM aggregator comprising:

a GHM transmitter connected to the at least one power line for transmitting GHM aggregator signals over the at least one power line;

a GHM receiver connected to the at least one power line, said GHM receiver receiving the GHM signals transmitted by the GHM transceiver over the at least one power line;

a controller coupled to said GHM receiver and said GHM transmitter, said controller processing the GHM signals received by said GHM receiver wherein said controller demodulates the GHM signals into the power consumption data and converts the power consumption data into at least one message;

a message storage unit connected to said controller for storing the at least one message produced by said controller; and a data outbound link coupled to said message storage unit and configured to transmit said at least one message from the message storage unit without employing the at least one power line as a transmission medium.

10. The communication system of claim 9 wherein said GHM aggregator further comprises a data inbound link coupled to the controller, said data inbound link receiving inbound messages transmitted without employing the at least one power line as a transmission medium.

11. The communication system in accordance with claim 9 wherein said data outbound link comprises a radio frequency transmitter.

12. The communication system in accordance with claim 9 wherein said data outbound link comprises a satellite uplink.

13. The communication system in accordance with claim 10 wherein said data inbound link comprises a radio frequency transmitter.

14. The communication system in accordance with claim 10 wherein said data inbound link comprises a satellite downlink.

15. The communication system in accordance with claim 9 wherein said data outbound link comprises a telecommunications link.

16. The communication system in accordance with claim 10 wherein said data inbound link comprises a telecommunications link.

17. The communication system in accordance with claim 1 wherein said transmitter of said data outbound link comprises a telecommunications link.

18. The communication system in accordance with claim 1 wherein said transmitter of said data outbound link comprises a radio frequency transmitter.

* * * * *